(12) United States Patent
Blanchard et al.

(10) Patent No.: US 8,210,498 B2
(45) Date of Patent: Jul. 3, 2012

(54) GATE VALVE FOR A SYSTEM FOR CIRCULATING COOLING AIR THROUGH A TURBOMACHINE

(75) Inventors: Stéphane Pierre Guillaume Blanchard, Chartrettes (FR); Thomas Daris, Paris (FR)

(73) Assignee: SNECMA, Paris (FR)

( * ) Notice: Subject to any disclaimer, the term of this patent is extended or adjusted under 35 U.S.C. 154(b) by 1104 days.

(21) Appl. No.: 12/110,001

(22) Filed: Apr. 25, 2008

(65) Prior Publication Data

US 2008/0265197 A1 Oct. 30, 2008

(30) Foreign Application Priority Data

Apr. 27, 2007 (FR) ..................................... 07 03047

(51) Int. Cl.
*F16K 1/16* (2006.01)
(52) U.S. Cl. ........ 251/300; 251/187; 251/228; 251/251; 251/301
(58) Field of Classification Search .................. 251/187, 251/203, 204, 228, 251, 257, 298, 300, 301
See application file for complete search history.

(56) References Cited

U.S. PATENT DOCUMENTS

| | | | |
|---|---|---|---|
| 4,219,183 A * | 8/1980 | Hoffmann et al. | 251/187 |
| 6,089,537 A * | 7/2000 | Olmsted | 251/251 |
| 6,328,051 B1 | 12/2001 | Maher | |
| 6,409,149 B1 * | 6/2002 | Maher, Jr. | 251/301 |
| 6,464,203 B1 * | 10/2002 | Ishigaki et al. | 251/301 |
| 6,776,394 B2 * | 8/2004 | Lucas | 251/301 |
| 2004/0124392 A1 | 7/2004 | Lucas | |

FOREIGN PATENT DOCUMENTS

EP 1 106 879 A2 6/2001
FR 2 860 045 A1 3/2005

* cited by examiner

*Primary Examiner* — Steven J Ganey
(74) *Attorney, Agent, or Firm* — Oblon, Spivak, McClelland, Maier & Neustadt, L.L.P.

(57) ABSTRACT

A gate valve for a system controlling cooling in a turbomachine is disclosed. The gate valve includes a gate mounted so that it can pivot about an axis between a position in which it shuts off an air passage orifice and a position in which it opens the orifice, and a rotating device for rotating the gate about the axis. The rotating device includes two superposed coaxial rotary members collaborating with one another via cam surfaces designed such that rotating the first rotary member from the shut-off position causes a translational movement of the second rotary member and of the gate along the axis of rotation followed by a rotation of this member and of the gate about this axis.

16 Claims, 5 Drawing Sheets

GATE VALVE FOR A SYSTEM FOR CIRCULATING COOLING AIR THROUGH A TURBOMACHINE

BACKGROUND OF THE INVENTION AND DESCRIPTION OF THE PRIOR ART

The present invention relates in general to a cooling system in a turbomachine, such as an aircraft turbojet engine, for cooling, in particular, the flaps of a jet pipe nozzle, and relates more specifically to a gate valve that forms part of this cooling system.

The jet pipe nozzle of a turbomachine generally comprises moving flaps which are subjected to high thermal stresses as a result of the passage of the very hot gases leaving the combustion chamber of the turbomachine. These thermal stresses generate a great deal of radiation in the infrared part of the spectrum liable to detract from the stealth of military aircraft, and this is why it is desirable to be able to limit the extent to which these flaps heat up.

One solution is to bleed cold air from a secondary stream of the turbomachine, in order to direct it toward the jet pipe nozzle flaps and cool them.

SUMMARY OF THE INVENTION

A particular object of the invention is means for supplying cooling air in a turbomachine, a short distance upstream of the jet pipe nozzle flaps, which means will be able to withstand high mechanical stresses generated by the thrust of the gases in this location, and substantial deformation of the jet pipe nozzle as a result of high thermal stresses.

Another subject of the invention is cooling air supply means which occupy little space and are relatively lightweight in order to optimize turbomachine performance.

A further subject of the invention is cooling air supply means that can be controlled manually by the pilot of the aircraft.

To these ends, the invention proposes a gate valve for a system controlling cooling in a turbomachine, comprising a gate mounted so that it can pivot about an axis between a position in which it shuts off an air passage orifice and a position in which it opens the orifice, and means for rotating the gate about the axis, wherein the means for turning comprise two superposed coaxial rotary members collaborating with one another via cam surfaces, the first of these members being fixed in terms of translational movement along its axis of rotation and the second of these members being capable of translational movement along this axis and bearing the gate, the cam surfaces being designed so that rotating the first rotary member from the shut-off position causes a translational movement of the second rotary member and of the gate along the axis of rotation followed by a rotation of this member and of the gate about this axis, the cam surfaces of the two rotary members being formed at the axial ends of these members and comprising ramps inclined in the form of a helix around the axis of rotation.

The valve according to the invention allows a simple rotation command to be converted into a complex movement of the gate made up, during valve opening, of a translational movement intended to move the gate away from its seat, followed by a rotation intended to bring the gate into the open position and, during valve closure, of a rotation of the gate in the opposite direction, intended to bring the gate back to face its closed position, followed by a translational movement in order to bring the gate firmly onto its seat. The translational movement of the gate preceding its rotational movement during valve opening avoids the gate rubbing against the supporting structure as it rotates, thus improving the reliability and durability of the valve. The use of an axial cam effect allows movement to be converted in a small space.

The ramps formed on each of the two rotary members convert a rotational movement of the first rotary member into a translational movement followed by a rotational movement of the second rotary member while at the same time allowing good transmission of movement between these members.

The inclined ramps are preferably connected at least at one of their ends to stop faces that are radial with respect to the axis of rotation.

Each ramp of the first rotary member thus comprises at least one radial stop face running parallel to the axis of rotation and formed at one of the ends of the ramp, this stop face being intended to butt against a corresponding stop face belonging to the second member so that during a valve closure command, the turning of the first member definitely causes the second member to turn. Each ramp belonging to the first rotary member may also comprise a second radial stop face running parallel to the axis of rotation and formed at the other end of the ramp, the purpose of this face being to butt against a corresponding stop face belonging to the second member so as to ensure that the second member will be turned by the first member upon a valve opening command.

Advantageously, the two rotary members are of cylindrical shape and are centered and guided in rotation in a fixed cylindrical bushing.

This bushing makes it possible to avoid wear on the supporting structure through the rubbing of the rotary members while at the same time being readily replaceable.

According to another feature of the invention, one end of the bushing has a cutout to accommodate a radial finger secured to the second rotary member, this radial finger being engaged in the cutout in the closed position in order to prevent the second rotary member from turning. More generally, the radial finger collaborates with the bushing in such a way as to define the path of the second member and of the gate in terms of translational and rotational movement.

The radial finger contributes to the axial cam effect in combination with the cam surfaces of the rotary members by preventing the second rotary member from turning and by guiding this second member in a pure translational movement as long as the finger is not clear of the cutout. When the second member has been moved over enough axial distance for the radial finger to come completely clear of the cutout, the second member is then turned by the first rotary member. The rotational path of this second member and of the gate that it bears is defined by an end edge of the cylindrical bushing against which the radial finger presses.

The gate valve according to the invention displays other advantageous features including:

in the closed position, the radial finger of the second member is engaged in the cutout in the bushing with axial play so as to ensure that the gate remains pressed against its seat, and therefore guarantee that the valve is adequately sealed when closed;

it comprises elastic return means axially urging the second rotary member and the gate toward the position in which the orifice is closed off;

the gate is a circular disk extending in a plane perpendicular to the axis of rotation and connected at its periphery to an annular lug via which it is mounted such that it can rotate about the axis;

the rotary members are tubular and have passing through them an axial rod, one end of which bears a gearwheel for turning it that rotates as one with the first rotary member, and an opposite second end of which comprises an annular flange for bearing axially against the annular lug of the gate, annular elastic return means being slipped over the first end of the rod and clamped against the gearwheel by a nut screwed onto this first end of the rod;

the gearwheel is mounted in a fixed housing comprising means for axially immobilizing this gearwheel;

the housing is fixed to the periphery of a casing comprising an annular cooling air manifold, this manifold comprising an air inlet orifice intended to be opened and closed by the gate belonging to the second rotary member.

The invention also relates to a device for cooling the controlled flaps of a turbojet jet pipe nozzle, comprising manually controlled cold air bleeding means installed on the turbojet casing and comprising gate valves of the type described hereinabove, which are preferably distributed uniformly about the axis of the turbojet engine.

This cooling device advantageously comprises a control actuator connected to the gate valves by a synchronous drive means such as, for example, a flexible cable or a ball cable, connected in series to the gate valves.

The gate valves of the abovementioned type allow a simple uniform translational movement of a means of controlling the respective means that drive these valves to be converted into a complex movement of the gate of each of the valves, making it possible to produce a cooling system controlled by a simple and single control means which may furthermore advantageously be chosen to be flexible, such as a ball cable, so that this system is able to withstand the deformations of the casing on which it is mounted and any mechanical stresses that might be generated by the pressure of the surrounding gases. The valves according to the invention can be used under conditions, particularly temperature conditions, that prevent the use of valves of the electrical type, such as is, for example, the case near a jet pipe nozzle of a turbomachine. The valves according to the invention also have the advantage of occupying very little space, thus making it possible to limit the aerodynamic impact that the cooling control system has on the flow of gases in the vicinity of the system. Valves such as this may also be distributed uniformly about the casing so as to allow air to be bled uniformly from all around this casing. Finally, the dynamics of the opening and closing of these valves optimizes their reliability and their durability and therefore the reliability and durability of the cooling system.

The invention also relates to a turbojet engine equipped with a cooling system of the type described hereinabove.

BRIEF DESCRIPTION OF THE DRAWINGS

The invention will be better understood and further details, advantages and features of the invention will become more clearly apparent from reading the following description given by way of nonlimiting example with reference to the attached drawings in which.

DESCRIPTION OF THE PREFERRED EMBODIMENT

Figure 1:
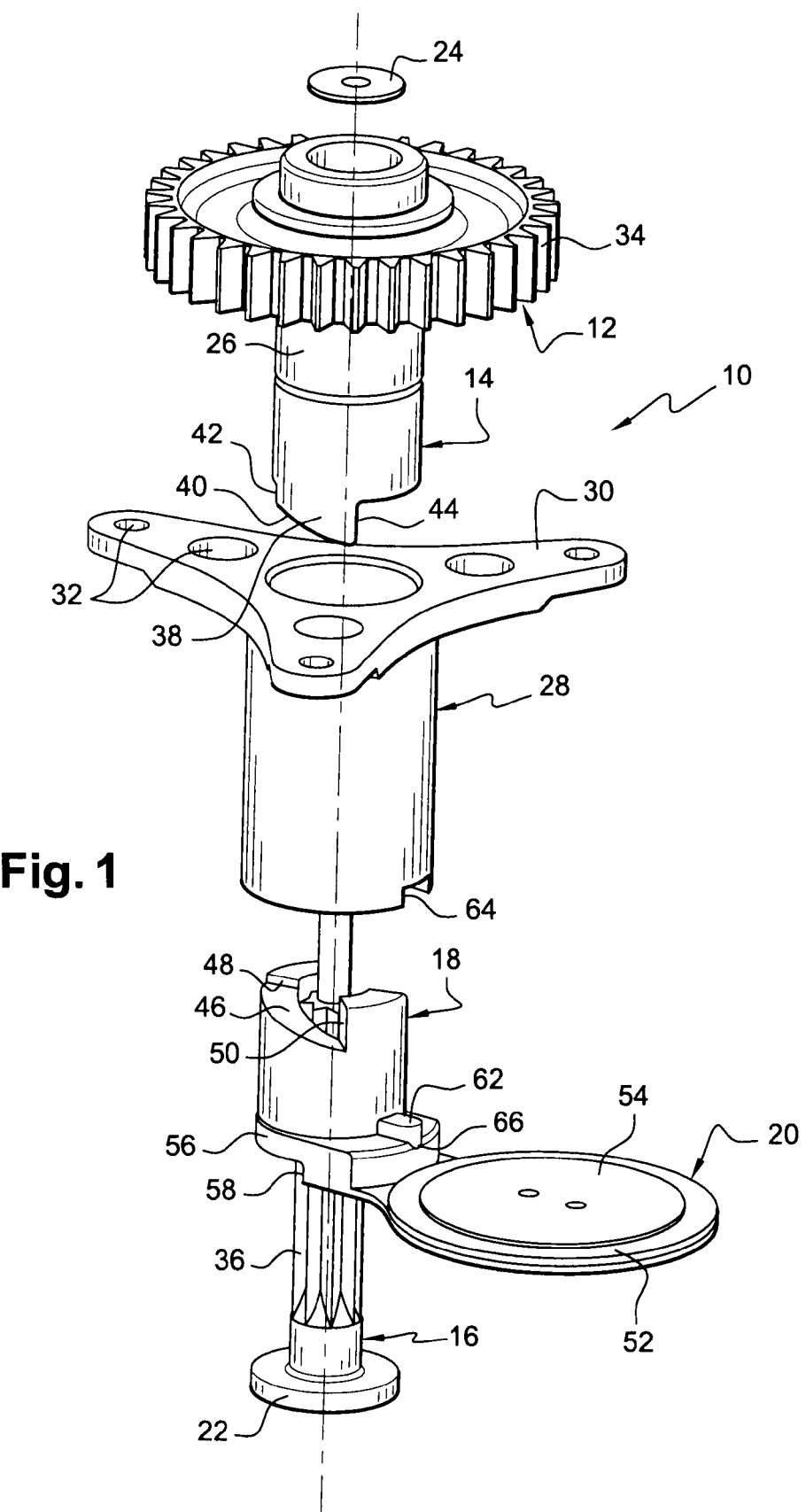
FIG. 1 is a partial schematic view in exploded perspective of a gate valve according to the invention.

Reference is made first of all to FIG. 1 which depicts a valve 10 comprising a gearwheel 12 for turning it and a first rotary member 14, which are mounted such that they can rotate about an axis of rotation 16 and which are intended to turn and to drive a translational movement of a second rotary member 18 and a gate 20 which are also mounted such that they can rotate about the axis 16, between a position in which this gate 20 opens an air passage orifice and a position in which it closes same.

The axis of rotation is embodied by an axial rod 16 which has an annular retaining flange 22 at its lower end near the gate 20 and which bears a set of elastic washers 24, such as corrugated or conical washers, at its other end, in order elastically to urge the rotary members upward. The flange 22 and the elastic washers 24 also cause the second rotary member 18 and the gate 20 to behave as one in terms of translational and rotational movement, as will become more clearly apparent later on, and in general hold the device together in the direction of the axis of rotation.

The rotary members 14 and 18 and a cylindrical skirt 26 belonging to the gearwheel 12 are housed, centered and guided in a cylindrical bushing 28 comprising three attachment arms 30 for securing it to a support structure, these arms being uniformly distributed about the bushing 28 and each having two fixing holes 32.

The gearwheel 12 has radial teeth 34 intended to mesh with appropriate drive means, one example of which will be described with reference to FIG. 8. This gearwheel 12 comprises splines (not visible in the figures) running radially along its internal face and intended to collaborate with splines 36 of substantially mating shape formed on the rod 16 so as to transmit the rotational movement of the gearwheel to this rod.

The first rotary member is a cylindrical ring 14 comprising, on its internal face, splines similar to those of the gearwheel so that this ring 14 is turned by the rod 16 and therefore turns as one with the gearwheel 12. The ring 14 has two teeth 38, one of which is hidden in the figures, which extend axially at the end of the ring 14 facing the second rotary member 18 and has a cam surface 40 in the shape of a ramp inclined in a helix, at the free end of each tooth. Each tooth 38 comprises two faces 42, 44 which are radial with respect to the axis of rotation 16 and run parallel to this axis, these two faces 42, 44 forming two stops for the rotational drive of the second rotary member 18, a first stop face 42 having an axial dimension smaller than that of the second stop face 44.

The second rotary member is a cylindrical ring 18 made to rotate as one with the gate 20 by a key, as will be described in greater detail later on, and the other end of which comprises two hollow parts or recesses that complement the teeth 38 of the ring 14. Each hollow part comprises a cam surface 46 in the form of a ramp inclined in a helix, extending radially from a first radial stop flange 48 as far as a second radial stop flange 50 and having a circumferential expanse greater than that of the cam surfaces 40 of the teeth 38 so that the first flange 48 constitutes a stop that turns the gate 20 toward its open position while the second flange 50 constitutes a stop that turns the gate 20 toward its closed position. The first radial stop flange 48 has an axial dimension substantially equal to the axial dimension of the first radial stop face 42 of each tooth 38 and the second radial stop flange 50 has an axial dimension substantially equal to the axial dimension of the second radial stop face 44 of the teeth 38 so as to optimize the contact between the stop faces of the teeth and the stop flanges of the hollow parts.

The gate 20 comprises a larger-diameter external circular disk 52 perpendicular to the axis of rotation 16 and the periphery of which is intended to be pressed against a seat or flange of an orifice that is to be closed off, and an internal disk 54 of smaller diameter formed on the external disk 52. The external disk 52 is secured at its periphery to an annular lug 56 mounted such that it can rotate about the axis 16 and comprising a circular recess 58 intended to accommodate the retaining flange 22 of the rod 16.

A radial finger 62 is formed at the lower end of the ring 18 facing the gate 20 and extends radial outward. This finger is intended to be engaged, when the gate is in its closed position, in a cutout 64 formed in the lower edge of the cylindrical bushing 28 facing the gate 20 so as to prevent the ring 18 from turning until the radial finger 62 is fully clear of the cutout 64.

The radial finger 62 extends axially beyond the edge of the second ring 18 so that its lower part is engaged in a slot 66 formed in the top surface of the lug 56 and located in such a way as to allow the cutout 64 and this slot 66 to become aligned when the gate is in its closed position. The radial finger 62 thus forms a key that secures the second rotary member 18 and the gate 20 together such that they rotate as one, by engaging in the slot 66 in the lug 56 of the gate.

The radial finger 62 is engaged in the cutout 64, on the one hand, and in the slot 66, on the other hand, by the elastic return means 24 mounted on the rod 16 and acting on the gate 20 and the ring 18 via the end flange 22 of the rod 16.

In the configuration described hereinabove, the ring 14 is a separate component from the gearwheel 12, although it rotates as one with this gearwheel, this being advantageous given that the first ring 14 is a component that is relatively difficult to produce because of its cam surfaces 40 and is therefore liable to generate a greater number of rejects than the gearwheel 12 which may be a standard component. The same type of advantage stems from the fact that the other ring 18 is a separate component from the gate 20.

As an alternative, the gearwheel 12 and the ring 14 could be formed as a single piece and, likewise, the gate 20 and the ring 18 could be formed as a single piece.

Figure 2:
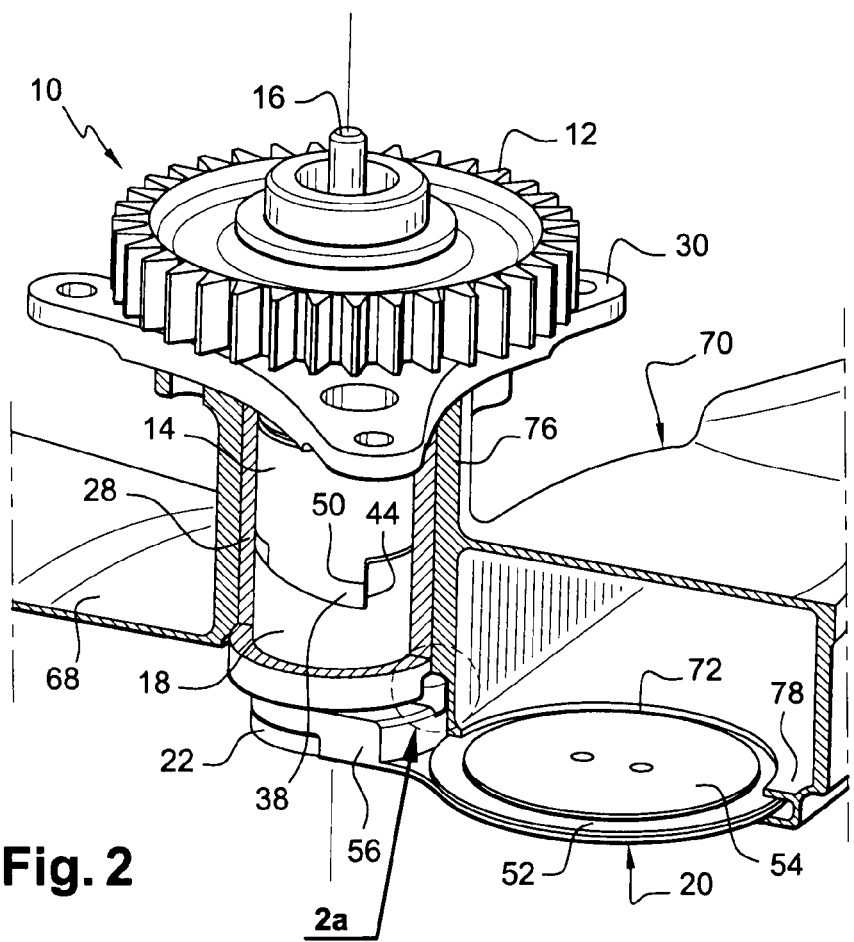
FIG. 2 is a partial perspective schematic view of this valve mounted on a turbojet engine jet pipe nozzle.
Figure 3:
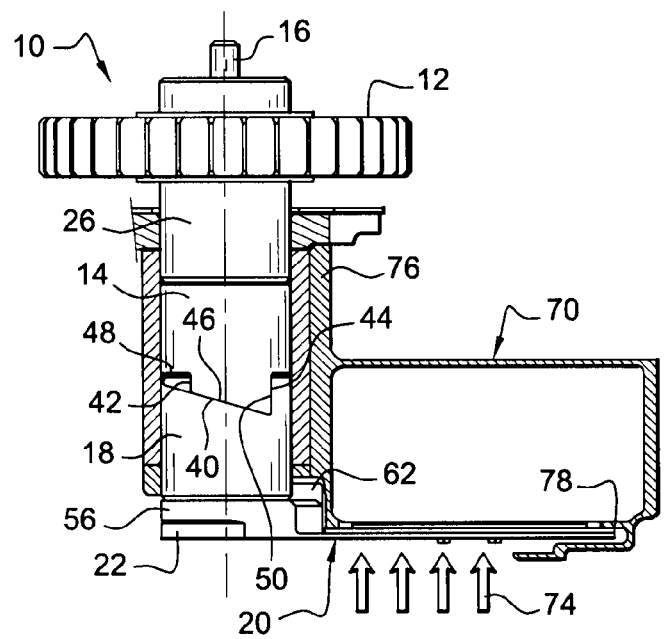
FIG. 3 is a schematic partial view in axial section of the gate valve mounted on the jet pipe nozzle.

FIGS. 2 and 3 depict the valve 10 mounted on a turbojet engine casing 63 on which there is formed an annular manifold 70 pierced with cooling air passage orifices 72 one of which has been depicted in the figures, this orifice being shut off by the gate 20 of the valve and preventing the cold air from the secondary stream, the thrust of which is depicted symbolically by the arrows 74, from entering the annular manifold. The cylindrical bushing 28 of the valve is housed in a chimney or cylindrical support 76 formed on the external face of the casing. The wall of the casing 68 forms an annular seat 78 for the gate 20 on the periphery of the orifice 72.

In the closed position depicted in FIGS. 2 and 3, the two teeth 38 of the ring 14 are positioned in such a way that their respective second radial stop faces 44, that have the larger axial dimension, are in contact with the corresponding second radial stop flanges 50 of the ring 18.

Figure 2A:
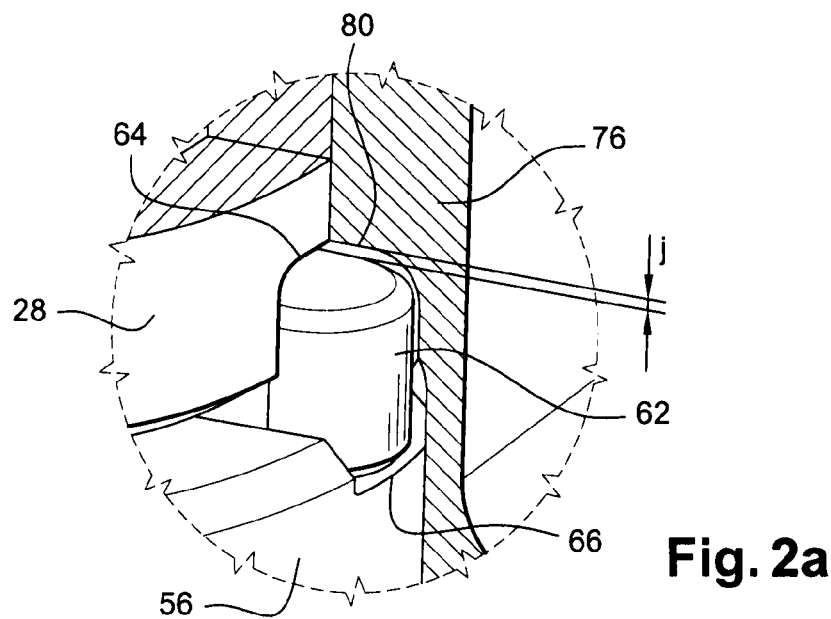
FIG. 2a is a view on a larger scale of part of FIG. 2.

FIG. 2a shows the radial finger 62 which is, on the one hand, engaged in the slot 66 in the lug 56 of the gate in order to cause the gate 20 and the ring 18 to rotate as one and, on the other hand, engaged with axial play j in the cutout 64 in the cylindrical bushing 28, and in a similar cutout 80 formed in the internal wall of the cylindrical support 76 surrounding the cylindrical bushing 28. The axial clearance j makes it possible to ensure that the gate 20 bears firmly against its seat 78 under the effect of the return force exerted on the rod 16 by all the elastic washers 24 and thus optimizes the sealing of the valve when closed.

Figure 4:
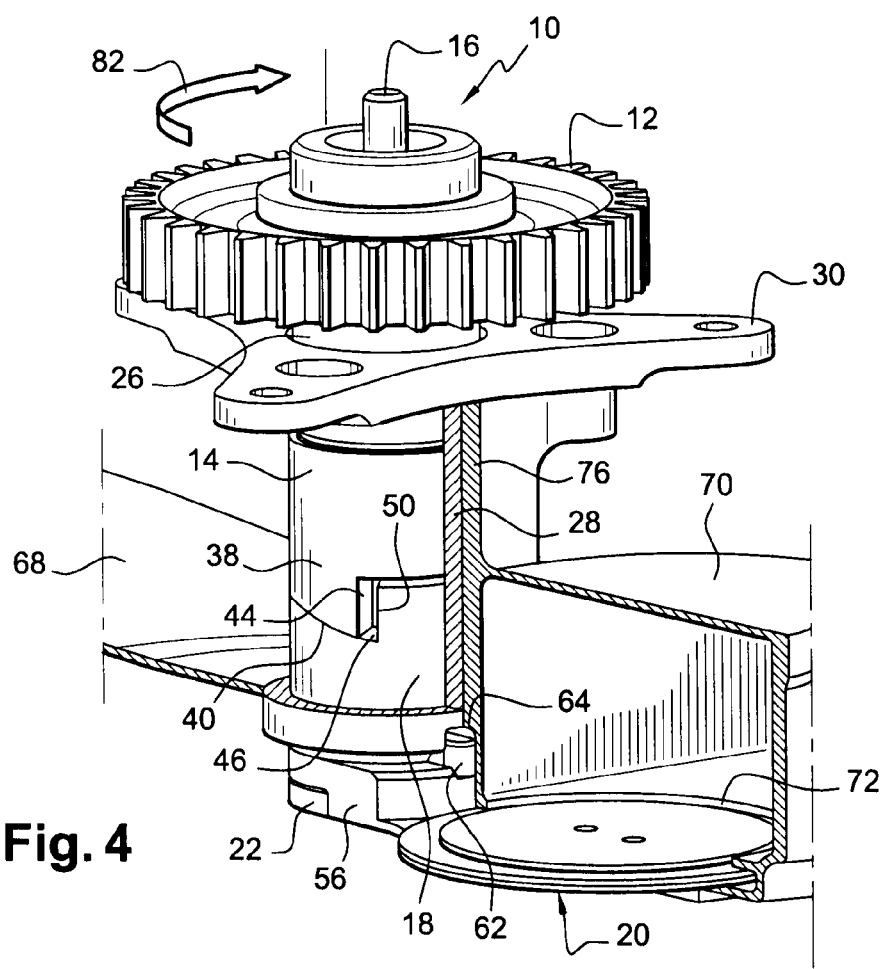
FIGS. 4 and 5 are views similar to FIG. 2 of the valve during the opening phase.

The valve according to the invention works as follows: with the valve initially in the closed position described above, all that is required, in order to open it, is for the gearwheel 12 to be turned in the clockwise direction as depicted by the arrow 82 in FIG. 4, using suitable means. Because the ring 18 is prevented from rotating by the radial finger 62 which is engaged in the cutout 64 of the cylindrical bushing 28, turning the ring 14 causes the second radial stop face 44 of each tooth 38 to move gradually away from the corresponding second radial stop flange 50 of the ring 18, and gives rise to an axial thrust exerted by the cam surface 40 of the ring 14 on the cam surface 46 of the ring 18 causing the ring 18 and the gate 20 to move axially, thus lifting the gate off its seat 78.

Figure 5:
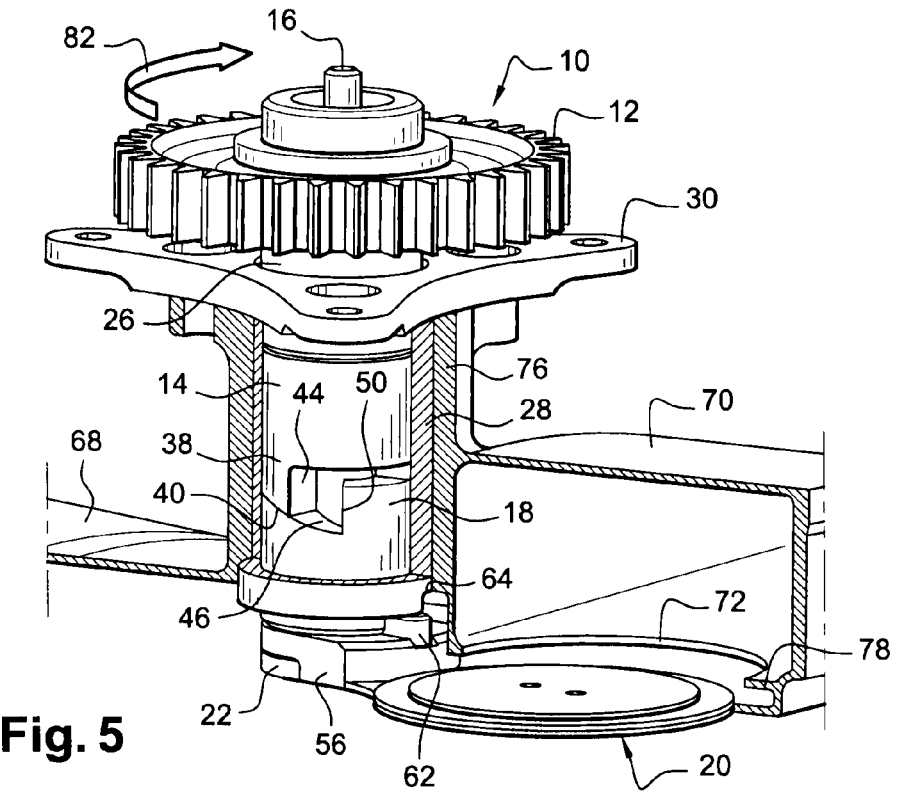

The axial movement of the ring 18 gradually drives the radial finger 62 out of the cutout 64. When this finger 62 has completely left the cutout 64 (FIG. 5), there is no longer anything to prevent the ring 18 from turning. The first radial stop face 42 of each tooth 38 then butts against the corresponding first radial stop flange 48 of the ring 18 so as to allow the ring 14 to turn this ring 18 so as to bring the gate 20 into its open position. The radial finger 62, also made to turn, is pressed against the lower end of the cylindrical bushing 28 under the effect of the return force exerted on the rod 16 by the collection of elastic washers 24 and transmitted to the lug 56 of the gate and to the second ring 18 by the flange 22 of this rod. The shape of the lower end of the bushing 28 thus determines the path of the gate 20 as far as its open position. Moving the gate 20 away from its seat 78 before turning it makes it possible to prevent the gate 20 from rubbing against the seat 78 and therefore prevents premature wear of these elements.

Figure 6:
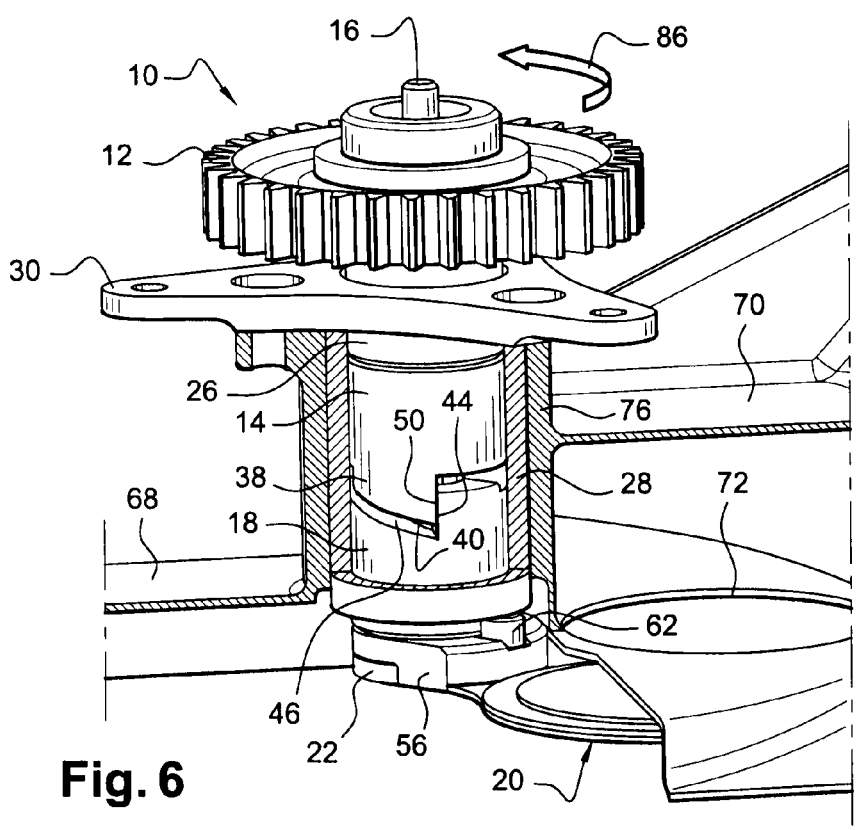
FIG. 6 is a view similar to FIG. 2 of the valve while it is being closed.

Valve closure (FIG. 6) is performed by turning the gearwheel 12 in the opposite direction, depicted by the arrow 86, so as to bring the second radial stop face 44 of each tooth 38 back into abutment with the corresponding second radial stop flange 50 of the ring 18 so as to turn this ring and the gate 20 into the closed position, the path of the gate again being determined by the fact that the radial finger 62 presses against the lower end of the bushing 28. When the radial finger 62 lies facing its cutout 64, the return force, exerted on the rod 16 by the collection of elastic washers 24, causes the gate 20 and the ring 18 to move axially until the gate is resting against its seat 78, in its closed position, the radial finger 62 then finding itself engaged in the cutout 64 once again.

The invention therefore provides a gate valve capable of allying small bulk with good reliability thanks to the absence of friction between the gate 20 and its seat 78, and which can be controlled through a simple translational movement of a control member in mesh with the gearwheel 12 belonging to the valve.

Figure 7:
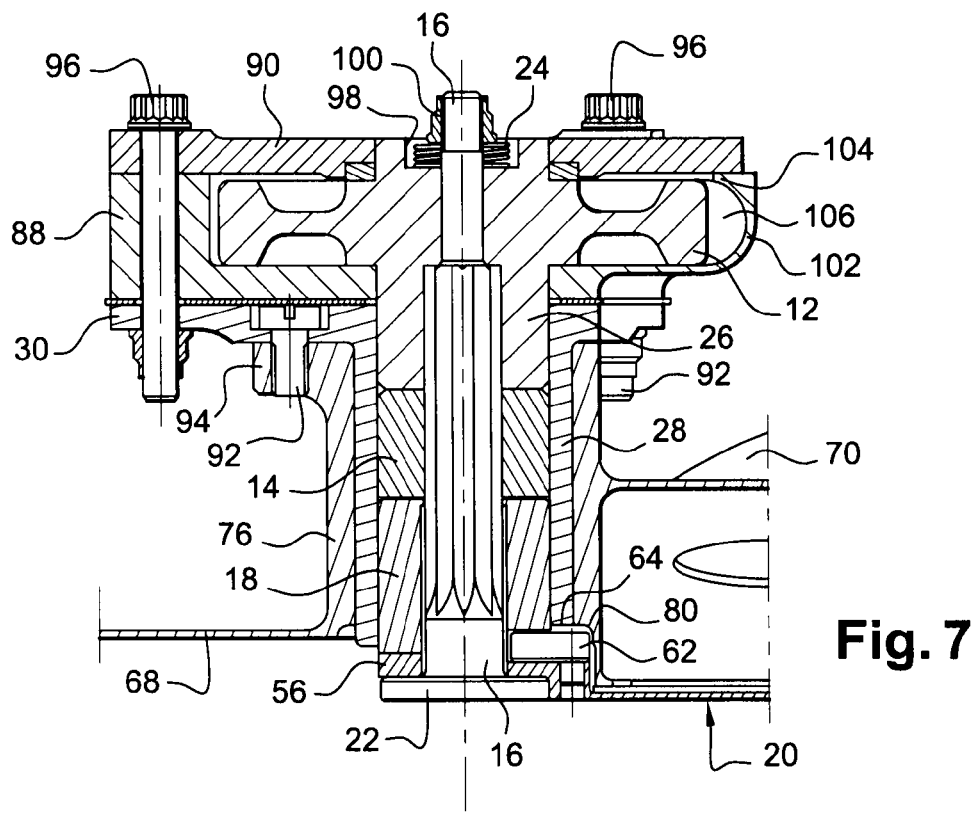
FIG. 7 is a schematic view in axial section of the gate valve according to the invention mounted on the jet pipe nozzle.
Figure 8:
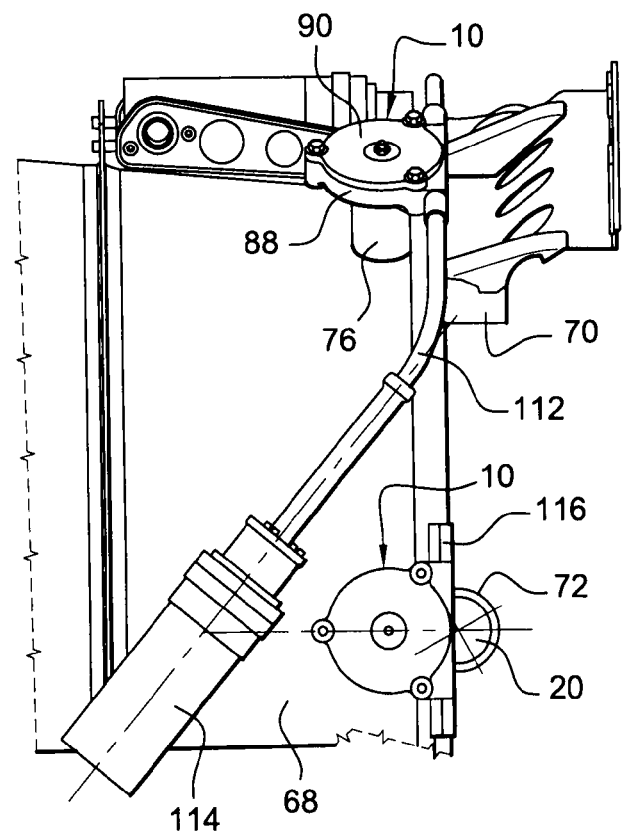
FIG. 8 is a schematic partial view in perspective of the jet pipe nozzle equipped with valves.

FIGS. 7 and 8 depict one example of a cooling system mounted on a jet pipe nozzle and comprising several valves 10 according to the invention.

In FIG. 7, a valve of the aforementioned type is mounted on the casing 68 of the jet pipe nozzle and built into a cowling comprising a substantially cylindrical support 76 secured to the casing 68, a housing 88 and a cover 90 which are substantially circular.

The cylindrical bushing 28 of the valve is mounted in the cylindrical support 76 and fixed to this support by means of screws 92 engaged respectively in the radially internal fixing holes belonging to the arms 30 of the cylindrical bushing, and in corresponding holes formed in arms 94 belonging to the cylindrical support 76.

The housing 88 rests on the arms 30 of the cylindrical bushing 28 and is capped by the cover 90 so as to form a substantially cylindrical enclosure for the gearwheel 12 of the valve, preventing any axial movement of this gearwheel 12, the housing 88 and the cover 90 being fixed by bolts 96 mounted in the radially external holes of the fixing arms 30 of the cylindrical bushing 28 and corresponding holes in the housing 88 and in the cover 90.

The cover 90 comprises a substantially central circular hole in which an upper end of the skirt 26 of the gearwheel 12 is guided. This end of the skirt 26 comprises a cylindrical recess 98 formed around the axis of rotation 16 and in which are positioned the elastic washers 24 mounted around the rod 16 and a nut 100 screwed onto the rod 16 to clamp the elastic washers against the gearwheel 12.

The housing 88 comprises a straight part 102 with a cylindrical flange 104 so as to form a semicylindrical straight aperture 106 through which a member for driving the gearwheel 12 can pass.

FIG. 8 shows the casing 68 of the jet pipe nozzle equipped with an annular manifold 70 formed on its external surface, this manifold comprising cooling air inlet orifices 72 uniformly distributed about the circumference of the manifold, and means of distributing this cooling air to the hot flaps of the jet pipe nozzle.

Each air inlet orifice 72 of the manifold is controlled by a valve 10 according to the invention, intended to control the opening and closing thereof.

The valves 10 are controlled by a flexible cable or by a ball cable 112 engaged in the semi-cylindrical aperture 106 of each valve 10 so as to drive the gearwheel 12, the cable 112 being actuated by an actuator 104 mounted on the jet pipe nozzle and connected to one end of the cable, the other end 116 of this cable being free where it leaves the last valve 10 controlled by this cable 112.

This system allows all the valves 10 distributed around the jet pipe nozzle to be controlled in a synchronized manner by means of a single control actuator 114, in order to cool the controlled flaps of the jet pipe nozzle of the turbojet engine, this system being controlled manually by the pilot of the aircraft.

The use of a flexible cable 112 for transmitting the control movement from the actuator 114 to the gearwheels 12 of the valves allows the system to withstand the deformations of the casing 68 on which it is mounted while at the same time being able to withstand the mechanical and thermal stresses generated by the flow of gases in the immediate surroundings of this system.

Furthermore, a cable 112 such as this does not need to be in a closed circuit, its opposite end 116 to the control actuator being able to remain free as has already been mentioned, thus allowing an advantageous saving on weight.

The invention claimed is:

1. A gate valve for a system controlling cooling in a turbomachine, comprising:
    a gate mounted so that the gate can pivot about an axis between a position in which the gate shuts off an air passage orifice and a position in which the gate opens the orifice; and
    means for rotating the gate about the axis,
    wherein the means for rotating comprise two superposed coaxial rotary members collaborating with one another via cam surfaces, the first rotary member being fixed in terms of translational movement along its axis of rotation and the second rotary member being capable of translational movement along the axis and bearing the gate, the cam surfaces being designed so that rotating the first rotary member from the shut-off position causes a translational movement of the second rotary member and of the gate along the axis of rotation followed by a rotation of the second rotary member and of the gate about the axis, the cam surfaces of the two rotary members being formed at axial ends of the rotary members and comprising ramps inclined in the form of a helix around the axis of rotation, and
    wherein the inclined ramps are connected at least at one of their ends to stop faces that are radial with respect to the axis of rotation, a stop face of the first rotary member being configured to come into abutment against a stop face of the second rotary member.

2. The gate valve as claimed in claim 1, wherein the two rotary members are of cylindrical shape and are centered and guided in rotation in a fixed cylindrical bushing.

3. The gate valve as claimed in claim 2, wherein one end of the bushing has a cutout to accommodate a radial finger secured to the second rotary member, this the radial finger being engaged in the cutout in the closed position in order to prevent the second rotary member from turning.

4. The gate valve as claimed in claim 3, wherein flanks of the cutout in the bushing collaborate with the radial finger to guide the second rotary member in its translational movement.

5. The gate valve as claimed in claim 3, wherein a lower end of the bushing collaborates with the radial finger to guide the second rotary member in its rotational movement.

6. The gate valve as claimed in claim 3, wherein, in the closed position, the radial finger of the second rotary member is engaged in the cutout in the bushing with axial play.

7. The gate valve as claimed in claim 3, further comprising an elastic return device axially urging the second rotary member and the gate toward the position in which the orifice is closed off.

8. The gate valve as claimed in claim 1, wherein the gate is a circular disk extending in a plane perpendicular to the axis of rotation and connected at its periphery to an annular lug via which the gate is mounted such that the gate can rotate about the axis.

9. The gate valve as claimed in claim 1, wherein the rotary members are tubular and have passing through them an axial rod, a first end of which bears a gearwheel for turning the rod that rotates as one with the first rotary member, and an opposite second end of which comprises an annular flange for bearing axially against the gate, an annular elastic return device being slipped over the first end of the rod and clamped against the gearwheel by a nut screwed onto the first end of the rod.

10. The gate valve as claimed in claim 9, wherein the gearwheel is mounted in a fixed housing for axially immobilizing the gearwheel.

11. The gate valve as claimed in claim 10, wherein the housing is fixed to a periphery of a casing comprising an annular cooling air manifold, the manifold comprising an air inlet orifice intended to be opened and closed by the gate belonging to the second rotary member.

12. A device for cooling the controlled flaps of a turbojet jet pipe nozzle and which comprises manually controlled cold air bleeding devices installed on the turbojet casing and comprising gate valves as claimed in claim 1.

13. The cooling device as claimed in claim 12, wherein the gate valves are distributed uniformly about the axis of the turbojet.

14. The cooling device as claimed in claim 12 further comprising a control actuator connected to the gate valves by a synchronous drive device connected in series to the gate valves.

15. The cooling device as claimed in claim 14, wherein the synchronous drive device is a flexible cable or a ball cable.

16. A turbojet engine comprising a device for cooling the controlled jet pipe nozzle flaps as claimed in claim 12.

* * * * *